Nov. 18, 1969 B. P. FUCHS 3,478,863
CORN EAR ORIENTING DEVICE
Filed Oct. 9, 1967 3 Sheets-Sheet 2
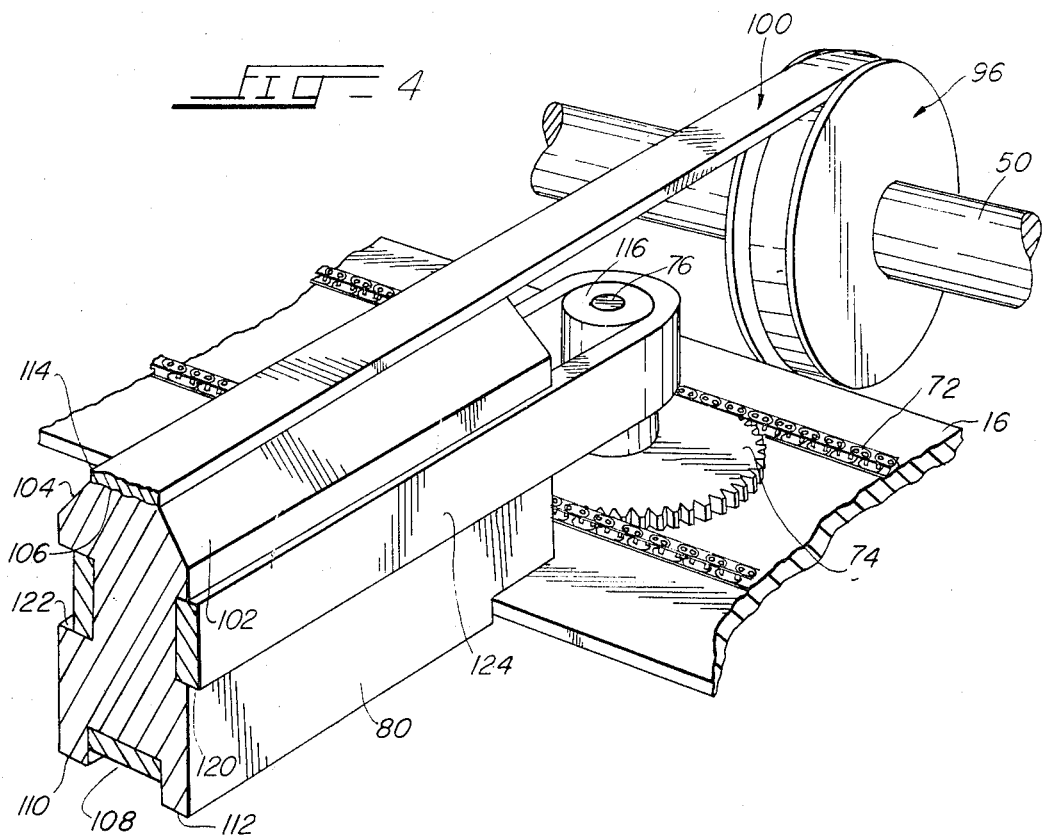
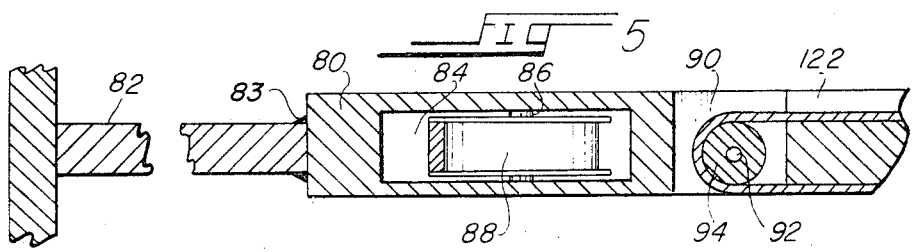
INVENTOR
BERNARD P. FUCHS
BY
ATTY

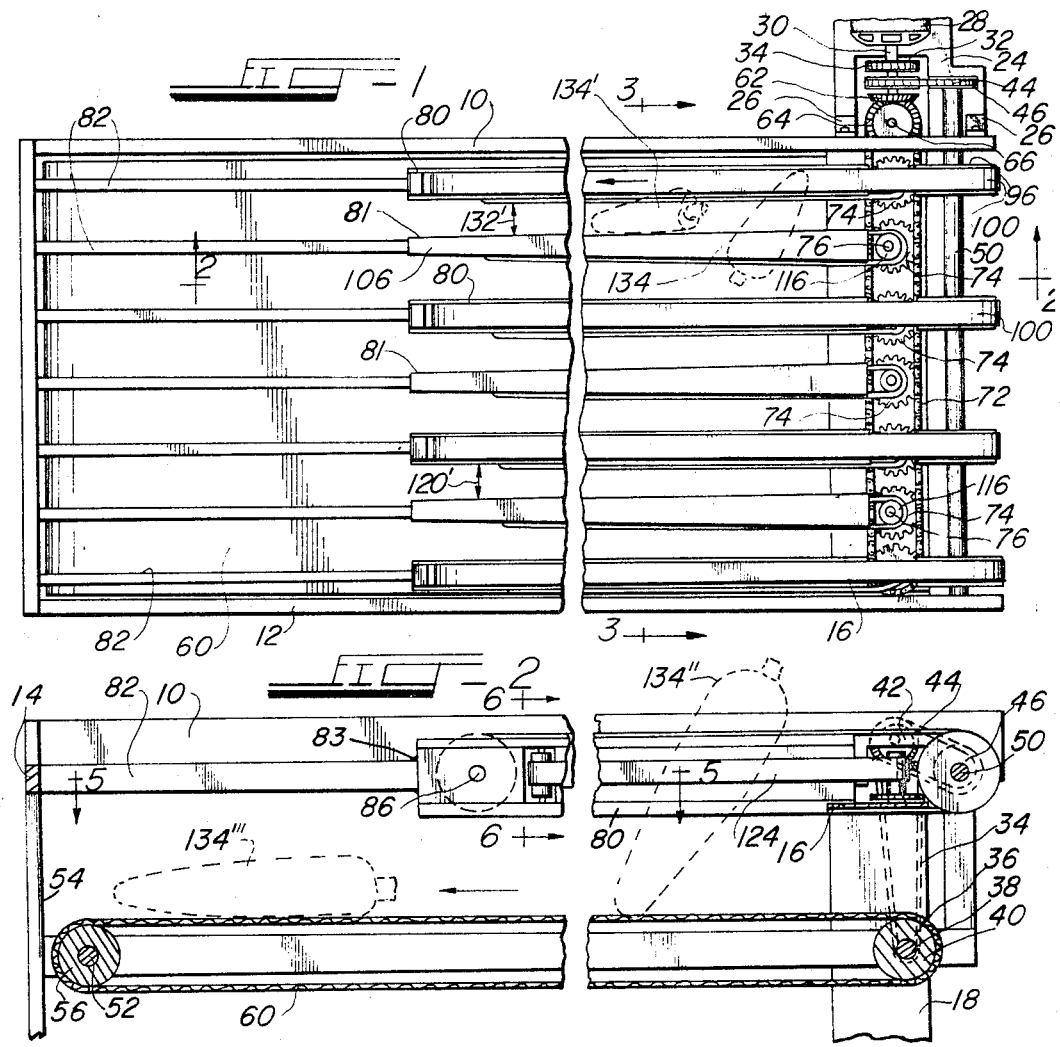
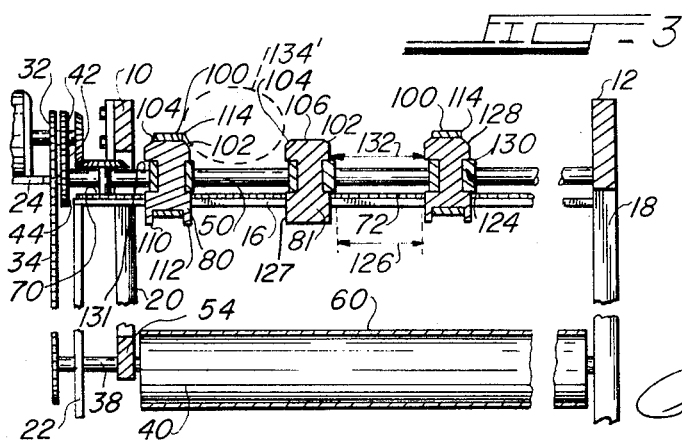

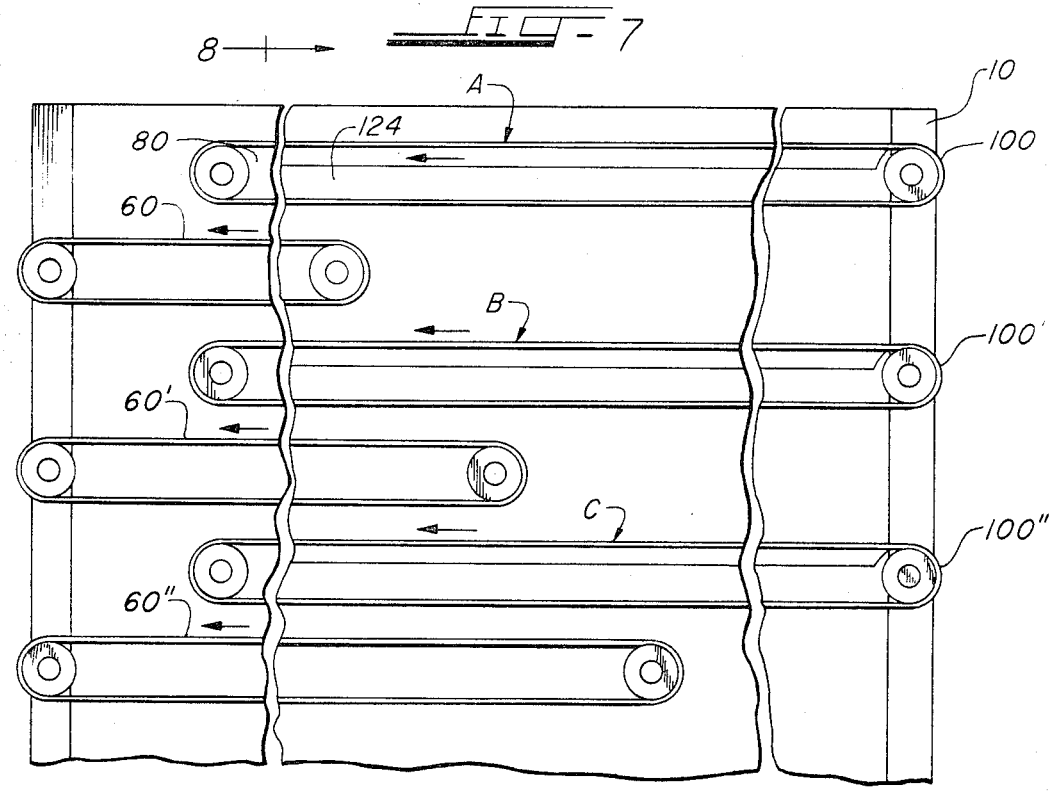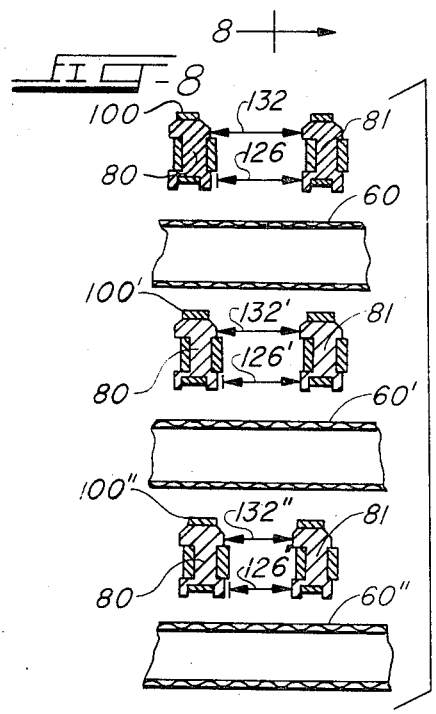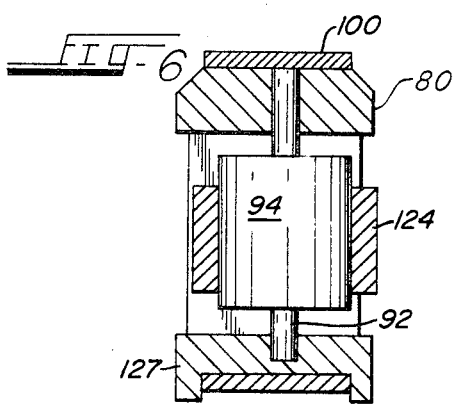

United States Patent Office 3,478,863
Patented Nov. 18, 1969

3,478,863
CORN EAR ORIENTING DEVICE
Bernard P. Fuchs, R.R. 3, Rochelle, Ill. 61068
Filed Oct. 9, 1967, Ser. No. 673,549
Int. Cl. B65g 47/24
U.S. Cl. 198—33               15 Claims

ABSTRACT OF THE DISCLOSURE

The disclosure describes a device adapted to axially and en-to-end orient and convey elongated objects of the same or different sizes and in one embodiment shows a first series of belts with their upper surfaces in a substantially horizontal plane and in spaced relationship cooperating with a second series of belts with their outer surfaces substantially vertical to and under said horizontal plane whereby the objects are aligned with their axes substantially parallel to the first belt surfaces and then are moved along in cooperation with the second belts to be dropped in a desired position or end-to-end orientation upon a third conveyor belt or into a receptacle or a processing machine. In one embodiment the horizontal distance between the vertical belts is changed so that the position of release of the objects is established at a desired point in relation to the effective diameters of the objects. Other embodiments are disclosed, including a conveyor system adapted to receive a truck load of corn ears, gradually and continuously orient the ears with their axis coincident with the direction of travel on the conveyor system, allow the ears to assume a substantially vertical position with the lower ends contiguous to a flat horizontal conveyor belt thereunder, traveling in the same direction but at greater or less speed whereby the ears are turned and fall thereon in a desired end-to-end orientation.

BACKGROUND OF THE INVENTION

This invention concerns the art of handling materials, particularly discrete objects of an elongated heterogeneous configuration requiring certain end for end orientation for processing. This invention also concerns the separation of elongated objects in accordance with their relative sizes and length for purposes of separate processing of each.

Conveyors for use with processing equipment are usually permanent structures and are frequently integral parts of manufacturing equipment, though portable conveyors of a number of types for certain classes of work are available. Conveyors are generally classified in accordance with the direction of movement for which they are primarily suited, as, horizontal, vertical and combined horizontal and vertical movements. Various forms of belts, chains, scrapers, rollers, screws, chutes, gravity feeds, vibrators, pneumatic and other means are used for these purposes especially where the materials to be conveyed are raw solid materials, granulated solids, solid finished or unfinished products or containers. The simple endless belt conveyor is adapted to take many forms and can be used for objects of different sizes.

Problems arise in handling objects which are of different sizes and shapes where their further processing requires or is best carried out with the objects assuming certain orientations with respect to the process machinery. An example is the feed system for a corn husker or corn cutting machine. The corn ears are generally circular in cross-section and have tapered ends with the butt end generally larger than the tassel end. For both husking the corn and cutting or stripping the kernels therefrom, the ears must be oriented so as to pass into the machine with either the butt end or tassel end first. Since the ears are generally of different diameters, then proper orientation for entry into the process machine is difficult. It is essential to avoid waste that all of the ears are oriented either butt end first, or tassel end first. It is also important that the ears be supported in accordance with their diameters which is one measure of the degree of maturity of fullness of the ear, not only for purposes of husking, but also to enable the processor to produce corn kernels of specified sizes of fullness of kernel for canning or as seed. It is also essential that the conveyor system have a large capacity, be positive in its conveying action, does not rub or crush the ears and be capable of receiving the corn ears by the truck load.

The corn cob is representative of an object which is difficult to handle rapidly and efficiently because the ears are heterogeneous in size, in diameter and length, and are generally tapered. Existing conveyors do not accomplish the necessary orientation and sizing functions for objects of this nature. The instant invention overcomes these and related problems in the conveyor art.

SUMMARY OF THE INVENTION

This invention concerns primarily the conveyor system adapted to convey elongated objects from a continuous or intermittent source to a remote location, while at the same time orient the objects axially and end-for-end in a desired manner. The invention provides a first series of conveyor belts operating with their belt surfaces in a generally horizontal plane with an intermediate second series of belts operating with their belt surfaces in a vertical plane thereunder wherein the spacing between all of the belts is such that means are provided for aligning the elongated objects into the common plane and parallel to the space between the lower belts and thereafter move and end-for-end orient the elongated objects for deposit at the remote location or processing point. In one embodiment of this invention, means are provided for aligning the elongated objects so that their axes are parallel to the space between the belts, allowing the objects to gravity orient with their axes subsantially vertical to said spaces, changing the spacial distance between the belts so that the elongated objects are ultimately released or ultimately engaged by another lower conveyor belt, traveling at the same or a different speed to cause the objects to fall thereon in an axially and end-for-end oriented manner.

In a particular embodiment of this invention, a conveyor system for use with a corn husker or corn cutter is provided. This system, which can handle bulk quantities of corn from a continuous source or dumped thereon from trucks, may comprise a first series of belts running from a common drive and having their belt surfaces in spaced horizontal relationship, a second series of belts also running from a common drive with their belt surfaces under and in vertical relationship between the aforesaid horizontal belts and also having their return portions recessed from the space, so that both the first and second series of belts present belt surfaces which are traveling in the same direction. The space between the horizontal belts may be the same along all the belt lengths in the horizontal plane and the space between the second series of vertical belts is gradually widened in the direction of travel, so that ultimately or in sequence objects of different sizes and diameters will be turned to the vertical by gravity and released. Furthermore, by providing a series of tiers on such conveyor systems, the elongated objects to be processed or to be conveyed are oriented, sized in accordance with their diameters and simultaneously moved from the source point to the processing point. In one embodiment, both the horizontal belts and the vertical belts are supported upon the top and sides on elongated unitary bars acting as guide members therefor which bars are spaced laterally from one another to accomplish the foregoing functions. The bars additionally provide flanged edges as guide members slidably retaining the belts thereon.

Provision is also made for the return portions of the lower belts to pass within dependent recesses between spaced flanges so that they become inoperable and in a space saving relationship within the assembly. The upper horizontal belts are carried on alternate bars in the assembly whereby the relative motion between the belt surface and the adjacent bar provides the axial orienting means for the elongated objects. The upper and lower belts may travel in the same or different directions and at the same or different speeds to accomplish a number of combinations of orienting and conveying functions.

The device of this invention can be used as a conveyor system for any type of processing equipment requiring a continuous source of longitudinally oriented elongated objects, or end-for-end oriented tapered elongated objects, such as ears of corn and the like.

DESCRIPTION OF THE DRAWINGS

One embodiment of this invention is shown in the drawings in which:

FIG. 1 is a fragmentary plan view of the top of a conveyor system employing the belt arrangement of this invention;

FIG. 2 is a fragmentary cross-sectional view taken along line 2—2 of FIG. 1;

FIG. 3 is a fragmentary cross-sectional view taken along line 3—3 of FIG. 1;

FIG. 4 is a fragmentary partially-sectioned enlarged view of one supporting bar with its cooperating horizontal and vertical belt and the drive means therefor;

FIG. 5 is a fragmentary longitudinal cross-sectional view of one supporting bar taken along line 5—5 of FIG. 2;

FIG. 6 is a partial cross-sectional view taken along line 6—6 of FIG. 2;

FIG. 7 is a diagrammatic representation of the use of a series of the conveyor assemblies of this invention for the purpose of orienting, sizing and conveying heterogeneous-sized, elongated objects from a common source to a plurality of remote points; and FIG. 8 is a cross-sectional view also partially diagrammatic taken along line 8—8 of FIG. 7 to show the relative spacing of the elements.

THE PREFERRED EMBODIMENT

Referring to the drawings, particularly FIGS. 1, 2 and 3, there is shown a conveyor system comprising the longitudinal side frame members 10 and 12 affixed at their ends to cross the member 14 and the end plate 16, forming a framework with supporting legs 18 and 20. At one end of the plate 16, there is a vertical support 22 and a side bracket 24, held by means of supports 26 to the member 10 to provide a shelf for the electric motor 28. As illustrated the frame members 10 and 12 extend upwardly on each side of the conveyor to form a box-like hopper into which the objects to be conveyed or sorted are dumped. Any type or frame or hopper can be used for purposes of this invention.

The electric motor 28 has its drive shaft 30 connected to a drive sprocket 32 (FIG. 3) engaging the drive chain 34 which extends around a driven sprocket 36 on the lower line shaft 38. The shaft 38 is rotatably mounted between the legs 18 and 20 and supports thereon the elongated drive pulley 40. The drive shaft 30 also has a second drive sprocket 42, spaced inwardly therefrom engaging the drive chain 44 which extends around the driven sprocket 46 on the end of the line shaft 50 similarly supported transverse the frame. It is seen that by this arrangement the operation of the drive motor 28 causes the rotation of the shafts 38 and 50 in the same direction, but at different speeds, since the sprocket 36 is smaller than the other sprockets. A remote line shaft 52 is carried at the other end of the frame member 54, with an elongated pulley 56 thereon. The lower conveyor belt 60 is carried by the drive pulley 40 and the driven pulley 56. The belt 60 is sufficiently wide to extend the transverse width of the assembly and may be of any desired length.

The drive shaft 30 has a bevel gear 62 affixed to the end thereof and engaging a second bevel gear 64, rotatably mounted on the vertical shaft 66 and supported by the plate 16. The lower end of the shaft 66 has a drive sprocket 70 which carries the elongated drive chain 72. The drive chain 72 operates in juxtaposition to the plate 16 along its length and engages each side of a series of equal-diameter driven sprockets 74, also rotatably mounted on the spaced vertical shafts 76 extending from the plate 16. The rotation of the drive sprocket 70 in one direction rotates all of the sprockets 74 in the same direction by means of the inter-connecting drive chain 72. Other means to drive the shafts 38, 50 and 76 can be used.

Opposite each of the sprockets and extending from a supported position (see FIGS. 3 and 4) from the inner edge of the plate 16, the assembly provides a series of longitudinally spaced elongated alternate bars 80 and 81, affixed at their extended ends to supporting tie rods 82 which may be welded as at 83 or otherwise attached. The other remote ends of the tie rods are attached to the cross member 14 or other suitable frame member.

As shown in FIGS. 5 and 6, the extended ends of the bars 80 each have a vertical cross bore 84 of rectangular section supporting the horizontal shafts 86 therein and upon which a series of pulleys 88 are rotatably mounted. Spaced inwardly from the cross bores 84 and also spaced from the ends of the alternate bars 81 are a series of horizontal cross bores 90 of rectangular section in each bar, supporting a series of vertical shafts 92 in rotational relationship. Each of the shafts 92 carries a pulley 94 thereon. As shown in FIG. 5 the shafts 92 are one side of the center lines of the bars 80 and 81.

On the other side of the plate 16 the shaft 50 has a series of spaced flanged pulleys 96 therealong and opposite or in line with each of the pulleys 88 of the bars 80. Each of the flanged pulleys 96 has a horizontal belt 100 extending along the top and bottom sides of the respective elongated bar 80, through the individual cross bores 84 and around their respective pulleys 88. The bars 80 and 81 have opposed beveled edges 102 and 104 on their top edges defining therebetween an elongated flat guiding surface 106. The bottom surfaces of the bars 80 have an elongated recess 108, defined by the parallel flanges 110 and 112 through which the belts 100 are guided in their return travel around their respective pulleys 88 and 96. The belts 100 are at least as wide as the top surface 106 so that their corner edges 114 extend above the plane of the bevelled surfaces 102 and 104 on each side. The widths of the bars 80 and 81 and the belts 100 are subject to variation and will generally be less than the largest diameter of the object to be conveyed. The pulleys 96 and 88 are aligned on their respective shafts to maintain this relationship during the motion of the belts 100. The bars 81 do not have a bottom flange and do not carry a belt on their top surfaces 106. The flanges 110 and 112 can be omitted and the bars 80 and 81 formed with identical cross-sections.

Above each of the sprockets 74 and affixed to the shafts 76 there is provided a vertical drive pulley 116 at the end of each bar 80 and 81. The shafts 76 are each off-set on the same side from the center line of the bars 80 and 81 to be in line with the vertical shafts 92. The sides of the bars 80 and 81 have oppositely facing elongated recesses or channels 120 and 122 there, as illustrated by bar 80 in FIG. 4, adapted to serve as guides for the vertically disposed belts 124, carried at their extended ends by and between the vertical pulleys 116 and 94. The channels 122 are deeper than the thickness of the belts 124 so that their outer surfaces do not extend beyond the sides of the bars 80 and 81, while the channels 120 are of lesser depth than the thickness of the belts 124 so that their outer surfaces extend beyond the side surfaces of the bars 80 and 81. The bars 80 and 81 are arranged with their deeper channels 122 on the same side (see FIG. 3) and the shallow channels 120 of opposed bars are thereby placed opposite thereto defining the space 126 between the outer surface of a belt 124 in a shallow channel and the side 127 of the adjacent bars as shown in FIG. 3. The outer edges 114 of the horizontal belts 100, the outermost corners 128 of the bevels 102 and the top outer edges 130 of the belts 120 are placed in substantially the same longitudinal plane along the length of the top surfaces of the bars 80. The assembly will preferably have a bar 80 carrying a horizontal belt 100 at both of the outside edges of the frame 10–12, and these outer bars are more closely spaced from the frame than the space 126 between the bars 80 and 81 central of the assembly. This prevents objects from being caught between the outer bars 80 and the frame. It is also apparent that a space 132 is provided between the top edges of the bars 80 and 81, extending the length of the bars. Provision is made for varying one or both of the spaces 126 and 132 along the length of the bars as will be described.

In the embodiment shown in the drawings the bars 81 are gradually tapered inward on both sides so that the bars are wider at the ends nearest the plate 16 and gradually narrow along their lengths to the junctures with the rods 82. This space 132 and the space 126 become gradually greater toward the discharge end of the assembly. This variation in the spacing between the bars is subject to adjustment depending on the diameters of the objects to be conveyed and serves as part of the orienting function of the device as will now be described.

Assuming the assembly thus far described, having at least a pair of bars 80 and 81 therealong is being used to convey ears of corn illustrated by the ear 134 which has fallen at the random position shown by the dotted lines in FIG. 1. The butt end rests upon the stationary surface 106 of the tapered bar 81. The belt 100 traveling in the direction of the arrow pivots the tassel end forward and the ear assumes the position 134' across the space 132, as shown in dotted lines in FIG. 1 and is carried along by interengagement between the edge 114 of this belt 100 and the smooth bevel surface 104 of the adjacent tapered bar 81 as shown in FIG. 3. When the ear 134 reaches the wider space 132' between the bars 80 and 81, the leading tassel end falls and the ear assumes the position 134" shown in FIG. 2. The tassel end touches the lower belt 60, which in one embodiment is traveling in the direction of the arrow (FIG. 2) and this frictional engagement carries the tassel end forward, provided the belt 60 is moving faster than the belt 100, so that when the space 132' becomes larger than the effective diameter of the ear it falls on the conveyor belt 60, tassel end first, as shown by the position of the ear 134''' for discharge into the receiver of a husking machine. Because of the natural vibration of the device and the movement of the belts, a good share of the ears will fall or roll into the position 134' at the start.

Those ears which fall or roll into a position opposite that of the ear 134, that is, with the tassel end on the tapered surface 106 of the bar 81 will be turned with their butt ends first in the position 134' and as they travel along will be raised slightly and be turned clock-wise by the frictional action of the belt 60, to ultimately assume the position shown by the ear 134'''. This action will take place with each of the ears of corn as they fall upon the plurality of conveyor belts 100 and surfaces 106. Thus, all of the ears will be oriented and dropped upon the belt 60 in the same end-for-end relationship. The conveyor system in the preferred embodiment has a plurality of bars 80 and 81 in substantially parallel relationship and is dimensioned so as to have a capacity (length and width) to receive bulk quantities such as a truck load of corn at a time. The speed of the belts is adjusted so that the ears are swept away, as they fall from the truck, at a rate sufficient to cause the foregoing actions to take place.

The device of this invention can be modified so as to provide an object-sizing function as well as end-for-end orientation of elongated tapered objects. One such arrangement is shown in FIGS. 7 and 8, wherein the frame 10 has been extended to include a stacked series of the assemblies shown in FIGS. 1, 2 and 3 with their respective belt assemblies 100, 100' and 100" operating in vertically spaced planes, one above the other, each having the bars 80 and 81 and side belts 124 etc. in the assemblies, as heretofore described, but with other details omitted for simplicity of illustration. In this embodiment the bars 81 are tapered. The spacings 126 and 132 of the bars 80 and 81 across the belt assembly 100 are larger than the corresponding spacings 126' and 132' between the bars 80 and 81 of the assembly 100', and, the spacings 126" and 132" of the lower assembly 100" is smaller than the spacings in assembly 100'.

Each assembly has thereunder a conveyor belt 60, 60' and 60" respectively, as shown, with individual drive means and the arrows show the direction of travel of the belts. The spacing 126 of the assembly 100 is such that the larger objects or ears are carried to the point A before dropping to the conveyor belt 60. The intermediate sized and smaller objects fall through this spacing onto the conveyor assembly 100' and the former are oriented and carried to point B therealong where the are dropped to the conveyor belt 60', while the smallest sized objects fall through the space 126' and are oriented by the assembly 100" for deposit at point C or thereafter upon the conveyor 60". The sized objects or ears from each of the conveyor belts 60, 60' and 60" are thereafter individually processed, from the discharge ends of the belts.

Instead of placing the belt assemblies 100, 100' and 100" one above the other, they may be spaced longitudinally from one another with secondary conveyor belts to carry those objects that fall through the spaced bars to a more remote next belt assembly. Such an arrangement can be used where it is necessary to perform additional operations, e.g. elimination of rejects in between the orientation and size sorting operation.

It is apparent that the conveyor of this invention may be modified and used in a number of different ways. The belts 100 can be caused to travel at different speeds across the width of the assembly to accommodate unbalanced deposits of objects to be processed. The assemblies do not need to be horizontal and can be adapted to elevate or lower the objects.

In the embodiments shown the belts 100 and the surfaces 106 lie in a plane which is substantially perpendicular to the plane of the individual belts 124. This relationship can be changed so that the belt surfaces of the belts 100 are sloping in pairs toward each other to give a trough effect with a bar 81 between and its surface 106 at the apex or below the inner edges of the belts. Also the channels 120 and 122 can be at an angle to the surfaces 106.

The direction of travel of the wide belt 60 can be opposite that of the belts 100 so that the intake and discharge ends of the assembly are at the same end. The belt 60 does not need to be horizontal or in a plane parallel to the belts 100 or the bars 80 and 81, and can be made to change the elevation of the objects. The distance between the belts 100 and the belt 60 can be varied or means can be provided to adjust this distance to accommodate objects of different lengths.

The belts may be flat as illustrated with rectilinear cross-sections or have other shapes such as to present their outer surfaces at an angle to the space 126. The belts may provide non-skid outer surfaces for positive engagement with the objects. A V-belt core can be provided on each belt for rolling engagement with V-shaped pulleys, instead of the wide flanged pulleys shown. The belt return channels 108 and 122 can be provided with removable covers to prevent dirt and debris from entering and abrading the belts. The bars 80 and 81 along with the belts 100 and 124 can be of different lengths i.e. the tie rods 82 can be omitted from the assemblies.

What is claimed is:

1. A conveyor comprising:
    (a) a pair of parallel elongated laterally spaced support members having horizontal top surfaces and mutually facing vertical side surfaces,
    (b) one of said support members having a belt movable along the horizontal surface thereof, and
    (c) the other of said support members having a movable belt extending along the vertical surface thereof facing said one support member, said belts moving in the same direction lengthwise of the support members.

2. A conveyor in accordance with claim 1 in which said other support member is tapered in one direction along its length so that the spaced relationship widens in the direction of travel of said belts.

3. A conveyor in accordance with claim 1 in which said other support member is tapered in the direction of travel of the belt thereon whereby the space between the outer surface of said belt and the opposed side of said one support member is gradually wider in the direction of travel of said belt.

4. A conveyor in accordance with claim 1 in which
    (a) said one support member has an upper and a lower belt-carrying surface with pulleys at the ends thereof adapted to carry said belt continuously therealong,
    (b) said one support member has opposed elongated channels in the sides thereof,
    (c) a second belt is mounted between spaced pulleys at the ends of said side channels,
    (d) the other of said support members has elongated channels in the opposite sides thereof, and
    (e) a third belt is mounted between spaced pulleys at the ends of said other support member side channels and is guided therealong.

5. A conveyor in accordance with claim 4 including a plurality of said pairs of support members mounted in parallel relationship with their upper surfaces in substantially coplanar relation and the sides of adjacent support members spaced apart substantially the same distance as the sides of each pair of support members.

6. A conveyor in accrdance with claim 4 including a fourth conveyor belt movable horizontally between spaced pulleys below said support members and adapted to receive and convey objects falling between the support member belts.

7. A conveyor system adapted to axially orient elongated objects including
    (a) a row of parallel elongated laterally spaced support member having upper surfaces in a substantially horizontal plane and their side surfaces uniformly spaced from each other,
    (b) said support members having elongated channels along each of their sides,
    (c) pulleys mounted on substantially vertical axes at each end of said support members,
    (d) belts carried by pairs of said vertical pulleys and adapted to be moved through and guided by said channels of said support members,
    (e) the channels on the same sides of said support members being of less depth than the thickness of said belts whereby the outer belt surfaces are beyond the plane of said sides of said support members,
    (f) the channels on the opposite sides of each of said support members being of greater depth than the thickness of said belts whereby the outer belt surfaces are inside said support members,
    (g) pulleys mounted on substantially horizontal axes at each end of alternate support member,
    (h) belts carried by said pairs of horizontal pulleys and adapted to be moved along the upper surfaces of said alternate support members,
    (i) means to drive said vertical and horizontal pulleys and said belts in the same direction along the length of said support members, and
    (j) the distance between said support members being widened in the direction of travel of said belts whereby an elongated tapered object upon said support members is carried therealong and oriented end-for-end by the horizontal belt on one support member and the stationary upper surface of an adjacent support member into axial alignment with the space between said support member, further engaged by the edges of said horizontal belt and then released through said widened space between adjacent support members.

8. A conveyor system in accordance with claim 7 in which a horizontal conveyor belt is movably mounted between spaced pulleys beneath said row of support members and is adapted to engage and convey said object.

9. A conveyor system in accordance with claim 7 adapted to axially and end-for-end orient elongated tapered objects in which
    (a) the distance between said support members is greater at one point therealong than the smaller diameter of said object whereby the object pivots into said space with its tapered end downawrd,
    (b) a lower horizontal conveyor belt is movably mounted between pulleys beneath said row of support members a distance sufficient to frictionally engage the downward end of said object, and
    (c) said lower conveyor belt is adapted to be moved in a different speed relation with the movement of said object whereby the tapered end of the object is oriented in a desired direction on said conveyor belt.

10. A conveyor system in accordance with claim 9 including means to move said lower conveyor belt in the same direction as said belts carried by said support members and at a higher linear speed.

11. A conveyor system in accordance with claim 9 including means to move said lower conveyor belt in the same direction as said belts carried by said support members and at a slower linear speed.

12. A conveyor system for elongated tapered objects adapted to axially and end-for-end orient said objects for subsequent processing comprising, in combination,
    (a) a frame work having side and end members adapted to receive bulk quantities of said objects,
    (b) a row of elongated laterally spaced support members having substantially flat upper surfaces arranged in a substantially horizontal plane between said side members and with their side surfaces uniformly spaced apart,
    (c) said support members having elongated channels along each of their sides,
    (d) a first set of pulleys mounted on a horizontal axis along one end of said framework, each of said pulleys being opposite the the ends of alternate support members,
    (e) a second set of pulleys mounted on a horizontal axis at the other end of said alternate support members and aligned in pairs with the pulleys of said first set,
    (f) a first set of belts carried between each of the aligned pairs of said first and second sets of pulleys, and adapted to be moved in unison along the upper surfaces of said support members upon rotation of one of said axes,
    (g) a lower conveyor belt mounted on spaced horizontal axes beneath said support member with its upper surface spaced thereunder a distance less than the length of the smallest of said objects to be conveyed,
    (h) and means to move said lower conveyor belt at a speed different than that of said first set of belts, whereby objects deposited onto the conveyor system and being axially aligned between said laterally spaced support members are carried along by said first set of belts until the space between the alternate support members and the intermediate support member allows engagement with the largest diameters of the objects and said objects are pivoted by gravity into a substantially vertical position with their narrow ends downward and in contact with said lower conveyor belt and said objects are further pivoted and dropped onto the said lower belt in predetermined end-for-end orientation therewith.

13. A conveyor system in accordance with claim 12 in which said lower conveyor belt is moved in the same direction and at a linear speed greater than said first and second set of belts.

14. A conveyor system in accordance with claim 12 in which said lower conveyor belt is moved in the same direction and at a linear velocity less than said first and second belts.

15. A conveyor system in accordance with claim 12 adapted to automatically axially and end-for-end orient and size ears of corn comprising:
   (a) a series of tiers of said support members stacked one above the other in spaced relationship within said framework,
   (b) a lower conveyor belt spaced beneath each of said tiers, said conveyor belts being progressively longer from top to bottom of said series,
   (c) the spacing between any pair of the support members of the successive tiers being progressively smaller from top to bottom of said series, and
   (d) said support member spacing being wider than the largest ear of corn retained by each tier at a point adjacent and above the beginning of the conveyor belt therefor.

References Cited

UNITED STATES PATENTS

| | | | |
|---|---|---|---|
| 2,671,550 | 3/1954 | Schultz | 198—30 |
| 3,179,237 | 4/1965 | Ninneman | 198—165 |

FOREIGN PATENTS 344,205  11/1921  Germany.

EDWARD A. SROKA, Primary Examiner